United States Patent
Huang et al.

(10) Patent No.: US 7,598,627 B2
(45) Date of Patent: Oct. 6, 2009

(54) SWITCH-MODE POWER SUPPLY

(75) Inventors: Chung-Chi Huang, Taipei Hsien (TW); Guang-Dong Yuan, Shenzhen (CN); Jian-Chun Pan, Shenzhen (CN); Wei-Min Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 289 days.

(21) Appl. No.: 11/773,976

(22) Filed: Jul. 6, 2007

(65) Prior Publication Data

US 2008/0150362 A1 Jun. 26, 2008

(30) Foreign Application Priority Data

Dec. 26, 2006 (CN) .................... 2006 1 0201404

(51) Int. Cl.
*H02J 9/06* (2006.01)
(52) U.S. Cl. .......................... 307/64; 307/125
(58) Field of Classification Search ............. 307/64–66, 307/116, 125, 130
See application file for complete search history.

(56) References Cited

U.S. PATENT DOCUMENTS

| | | | | | |
|---|---|---|---|---|---|
| 4,754,160 | A | * | 6/1988 | Ely ........................ | 307/64 |
| 4,788,450 | A | * | 11/1988 | Wagner .................... | 307/64 |
| 5,598,041 | A | * | 1/1997 | Willis ...................... | 307/43 |
| 6,314,523 | B1 | * | 11/2001 | Voltz ....................... | 713/324 |
| 6,642,697 | B2 | | 11/2003 | Zuniga et al. | |
| 7,420,295 | B2 | * | 9/2008 | Omae et al. ............... | 307/66 |

* cited by examiner

*Primary Examiner*—Albert W Paladini
(74) *Attorney, Agent, or Firm*—Frank R. Niranjan

(57) ABSTRACT

A switch-mode power supply for selectively providing power from a main power source and a standby power source to an electronic device is provided. The switch-mode power supply includes a signal input, a first transistor, a second transistor, a driving circuit, and a switching circuit. The signal input is used for receiving a control signal. The driving circuit and switching circuit connect the signal input to the gate of the second transistor in series. When the driving circuit detects the first transistor is switched off, the gate of the second transistor is immediately pulled up to open the second transistor, and when the driving circuit detects the first transistor is switched on, the gate of the second transistor is immediately pulled down to close the second transistor.

12 Claims, 3 Drawing Sheets

SWITCH-MODE POWER SUPPLY

BACKGROUND OF THE INVENTION

1. Field of the Invention

The present invention relates to a switch-mode power supply (SMPS). In particular, the present invention relates to a switch-mode power supply for preventing current overflowing between the MOS transistors during switching.

2. Description of Related Art

In general, a switch-mode power supply (SMPS) converts a direct current (DC) supply voltage into one or more DC output voltages that have a greater or lesser magnitude than the DC supply voltage. SMPSs are widely used in power electronic devices, particularly battery-powered devices such as portable cellular phones and laptop computers. Typically, SMPSs have a normal operation mode and a standby operation mode. Power electronic devices consume a large amount of power in the normal operation mode, as compared to the standby operation mode. Power electronic devices may automatically enter the standby operation mode when a user does not use the device for a predetermined time, and may automatically enter the normal operation mode when the user resumes the use of the device.

FIG. 1 shows a conventional switching mode power supply. A control signal from a signal input SCL1 is transmitted to driving devices 10 and 20. Each of the driving devices 10 and 20 outputs a signal to drive a P-channel metal oxide semiconductor (PMOS) transistor M1 and a N-channel metal oxide semiconductor (NMOS) transistor M2 respectively. A source of the NMOS transistor M2 is connected to a main power source V1, and a source of the PMOS transistor M1 is connected to a standby power source V2. Each drain of the PMOS transistor M1 and the NMOS transistor M2 acts as a voltage output Vo.

When the control signal from the signal input SCL1 is in a high level, each of the driving devices 10 and 20 outputs a high level signal, so the PMOS transistor M1 is turned off while the NMOS transistor M2 is turned on, and the drain of the NMOS transistor M2 outputs a main voltage from the main power source V1. When the control signal from the signal input SCL1 is in a low level, each of the driving devices 10 and 20 outputs a low level signal, so the PMOS transistor M1 is turned on while the NMOS transistor M2 is turned off, and the drain of the PMOS transistor M1 outputs a standby voltage from the standby power source V2.

An ideal operation state of the conventional switching mode power supply is the PMOS transistor M1 and the NMOS transistor M2 being switched on or off in turn. However, parameters of the PMOS transistor and the NMOS transistor are different because of the manufacturing technology, the scheduling error may occur between the switching of the PMOS transistor and the NMOS transistor. As a result, there can be an overlap time during the switching time, that is, the PMOS transistor M1 and the NMOS transistor M2 may both be switched on at the same time, which causes a large current from the main power source V1 to the standby power source V2 that may ruin the PMOS transistor and the NMOS transistor.

What is needed is a switch-mode power supply for preventing current overflowing between the MOS transistors during switching.

SUMMARY OF THE INVENTION

An exemplary switch-mode power supply for selectively providing power from a main power source and a standby power source to an electronic device is provided. The switch-mode power supply includes a signal input, a first transistor, a second transistor, a driving circuit, and a switching circuit. The signal input is used for receiving a control signal. The driving circuit and switching circuit connect the signal input to the gate of the second transistor. When the driving circuit detects the first transistor is switched off, the gate of the second transistor is pulled up immediately to open the second transistor, and when the driving circuit detects the first transistor is switched on, the gate of the second transistor is pulled down immediately to close the second transistor.

Other advantages and novel features of the present invention will become more apparent from the following detailed description of preferred embodiment when taken in conjunction with the accompanying drawings, in which:

DETAILED DESCRIPTION OF THE INVENTION

Figure 1:
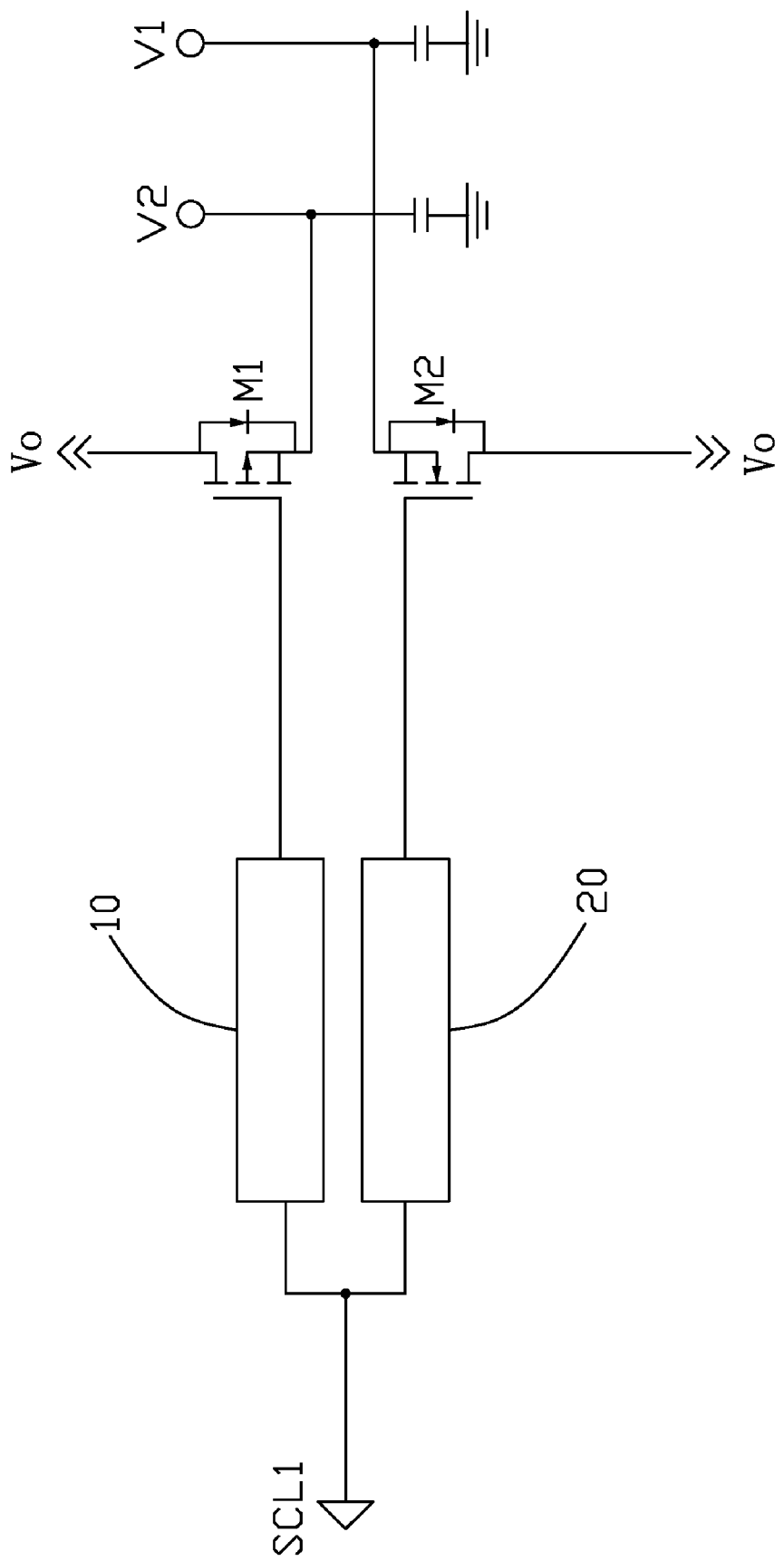
FIG. 1 is a circuit diagram of a conventional switch-mode power supply.
Figure 2:
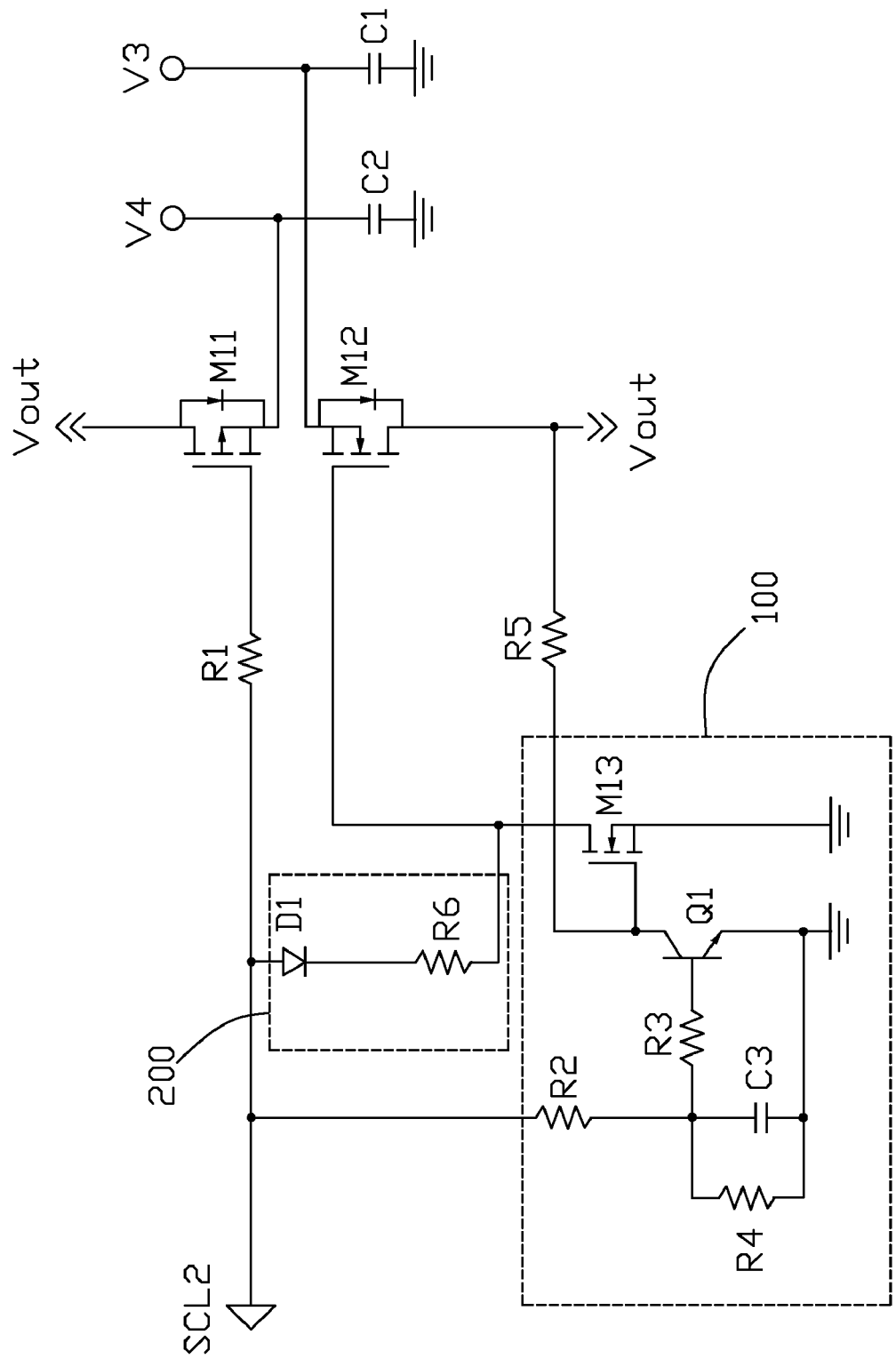
FIG. 2 is circuit diagram of a switch-mode power supply according to a preferred embodiment of the present invention.

Referring to FIG. 2, a switch-mode power supply according to an embodiment of the present invention includes a signal input SCL2 for receiving a control signal, a PMOS transistor M11, an NMOS transistor M12, a main power source V3 for providing a main voltage, a standby power source V4 for providing a standby voltage, a driving circuit 100, and a switching circuit 200.

The signal input SCL2 is connected to a gate of the PMOS transistor M11 via a resistor R1. The signal input SCL2 is connected to a gate of the NMOS transistor M12 via the driving circuit 100, and connected to the gate of the NMOS transistor M12 via the switching circuit 200. A source of the NMOS transistor M12 is connected to a main power source V3, and a source of the PMOS transistor M11 is connected to a standby power source V4. A drain of each of the PMOS transistor M11 and the NMOS transistor M12 acts as a voltage output Vout. The main power source V3 and the standby power source V4 are respectively connected to a capacitor C1 and a capacitor C2 for wave filtering.

The driving circuit 100 includes a Bipolar Junction Transistor (BJT) Q1, an NMOS transistor M13, resistors R2, R3, and R4, and a capacitor C3. The BJT Q1 has a base, an emitter, and a collector. One end of the resistor R2 acts as an input of the driving circuit 100 to connect to the signal input SCL2 for receiving the control signal, and the other end of the resistor R2 is grounded via the capacitor C3. The resistors R3, R4 and the capacitor C3 are all connected in parallel. The base of the BJT Q1 is connected to a node between the resistor R2 and the capacitor C3 via the resistor R3. The collector of the BJT Q1 is connected to a direct current power source via a pull-up resistor. In this embodiment, the collector of the BJT Q1 is connected to the voltage output Vout via a resistor R5. The emitter of the BJT Q1 is grounded. A gate of the NMOS transistor M13 is directly connected to the collector of the BJT Q1, a source of the NMOS transistor M13 is grounded, and a drain of the NMOS transistor M13 acts as an output of the driving circuit 100 to connect to the gate of the NMOS transistor M12.

The switching circuit 200 includes a diode D1, and a resistor R6. An anode of the diode D1 connects to the signal input SCL2 for receiving the control signal, and a cathode of the diode D1 is connected to the gate of the NMOS transistor M12 via the resistor R6.

During the rise of the control signal from the signal input SCL2, the control signal is transmitted to the gate of the PMOS transistor M11 via the resistor R1, M11 is on. The control signal is divided by the resistors R2 and R4. The divided voltage is sent to the base of the BJT Q1. When the divided voltage reaches a turn-over voltage of the BJT Q1, the PMOS transistor M11 turns off, and the BJT Q1 is turned on. The NMOS transistor M13 turns off. At which time the voltage at the gate of M12 quickly rises under the control of the driving circuit 100 to turn on the NMOS transistor M12. Thus the main voltage of the main power source V3 is output from the voltage output Vout.

During falling-off of the control signal from the signal input SCL2, before the divided voltage is down to the turn-over voltage of the BJT Q1, the PMOS transistor M11 stays off, and the BJT Q1 is turned on. The NMOS transistor M13 is off, voltage at the gate of the NMOS transistor M12 falls slowly via the switching circuit 200, at this time the NMOS transistor M12 is still on. When the divided voltage falls to the turn-over voltage of the BJT Q1, the PMOS transistor M11 is turned on, and the BJT Q1 is turned off. The NMOS transistor M13 is turned on, which makes the gate of the NMOS transistor M12 quickly pull down to ground to turn off the NMOS transistor M12. The standby voltage of the standby power source V4 is output from the voltage output Vout.

Figure 3:
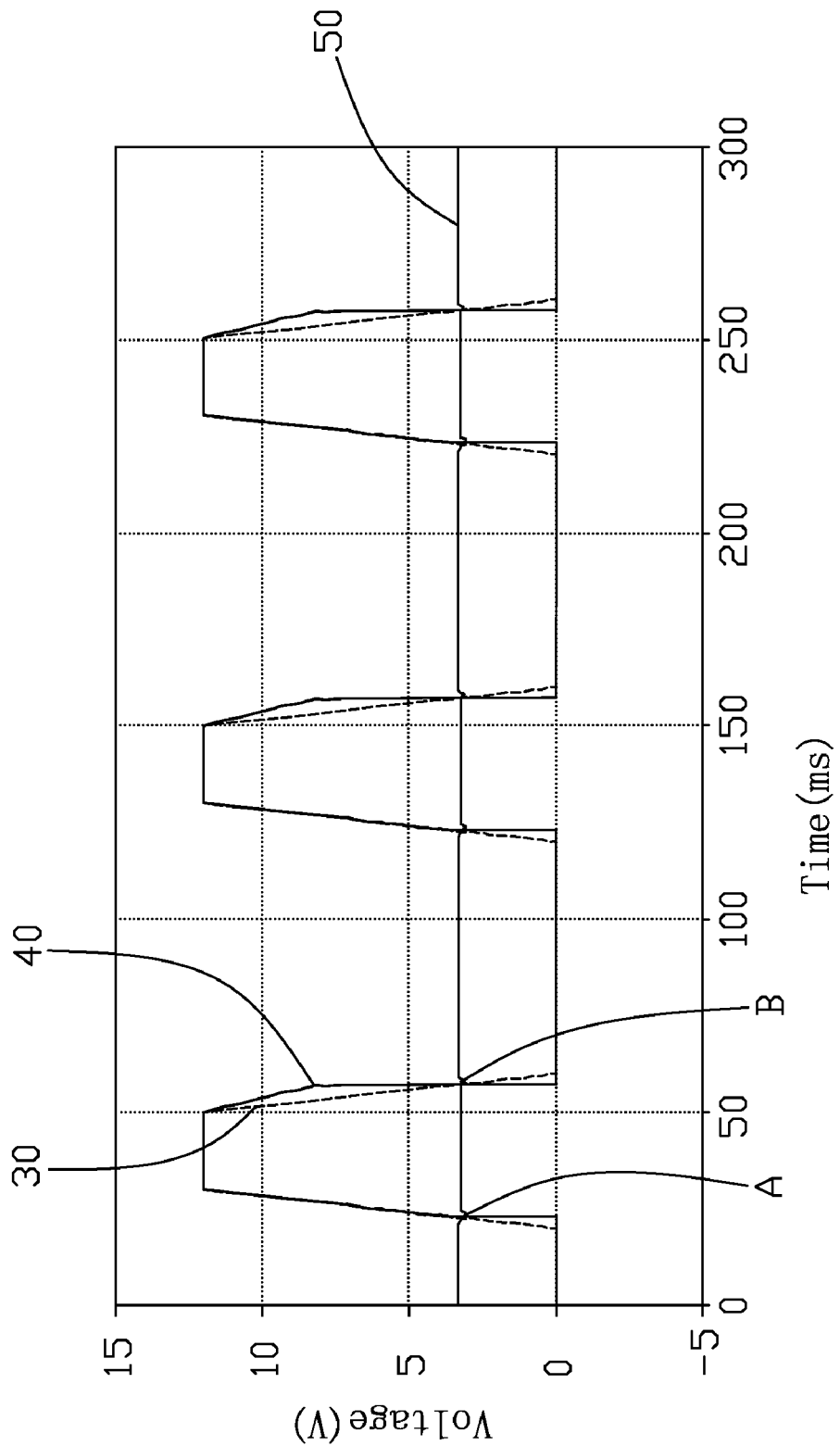
FIG. 3 is a graph comparing waveforms generated at gates of the PMOS transistor M11 and the NMOS transistor M12, and voltage output of the switch-mode power supply of FIG. 2.

Referring also to FIG. 3, the curves 30 and 40 respectively represents the gate voltage waveforms of the PMOS transistor M11 and the NMOS transistor M12, the curve 50 represents the waveform of the voltage output of the switch-mode power supply. At the point A of the curve 50, when a voltage of the gate of the PMOS transistor M11 rise to a turn-off voltage, the voltage of the gate of the NMOS transistor M12 quickly rises under the control of the driving circuit 100, which makes the NMOS transistor M12 turn on to output the main voltage. At the point B of the curve 50, when a voltage of the gate of the PMOS transistor M11 falls to a turn-on voltage, the voltage of the gate of the NMOS transistor M12 quickly falls under the control of the driving circuit 100, which make the NMOS transistor M12 turn off.

During changing of the control signal from the signal input SCL2, the NMOS transistor M12 can adjust its on-off state quickly with the state of the PMOS transistor M11, allowing the PMOS transistor M11 and the switching NMOS transistor M12 to switch on-off in a consistent manner, avoiding overlapping of transition times during switching. Thereby, damage to the PMOS transistor M11 and the NMOS transistor M12 by a large current flowing from the main power source V3 to the standby power source V4 can be avoided.

In other embodiments, the driving circuit 100 can be assembled with PMOS transistors or NMOS transistors.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A switch-mode power supply for selectively providing power from a main power source and a standby power source to an electronic device, comprising:
   a signal input for receiving a control signal;
   a first transistor having a gate connected to the signal input for receiving the control signal, a drain acting as a voltage output, and a source connected to the standby power source;
   a second transistor having a gate, a drain acting as the voltage output, and a source connected to the main power source;
   a driving circuit and a switching circuit connected between the signal input and the gate of the second transistor in parallel such that when the driving circuit detects the first transistor is switched off, the gate of the second transistor is immediately pulled up to open the second transistor by the switching circuit, and when the driving circuit detects the first transistor is switched on, the gate of the second transistor is immediately pulled down by the driving circuit to close the second transistor.

2. The switch-mode power supply as described in claim 1, wherein the first transistor is a PMOS transistor and the second transistor is an NMOS transistor.

3. The switch-mode power supply as described in claim 1, wherein the driving circuit comprises an NPN transistor and an NMOS transistor, an emitter of the NPN transistor is grounded, a collector of the NPN transistor is connected to a gate of the NMOS transistor, a base of the NPN transistor is controlled by the control signal to switch on-off the NPN transistor, a source of the NMOS transistor is grounded, a drain of the NMOS transistor is connected to the gate of the second transistor.

4. The switch-mode power supply as described in claim 3, wherein the switching circuit comprises a diode, and a resistor connected in series, an anode of the diode is used for receiving the control signal from the signal input, a cathode of the diode is connected to the gate of the second transistor via the resistor.

5. The switch-mode power supply as described in claim 3, wherein the collector of the NPN transistor is connected to the voltage output via a pull up resistor.

6. The switch-mode power supply as described in claim 3, wherein the driving circuit further comprises a first resistor, a second resistor, and a third resistor, one end of the first resistor acts as an input of the driving circuit for receiving the control signal from the signal input, and the other end of the first resistor is connected to the base of the NPN transistor via the second resistor, a node between the first resistor and the second resistor is grounded via the third resistor.

7. The switch-mode power supply as described in claim 6, wherein the driving circuit further comprises a capacitor connected in parallel with the third resistor.

8. A switch-mode power supply, comprising:
   a signal input for receiving a control signal;
   a first transistor having a gate connected to the signal input, a drain acting as a voltage output, and a source connected to a standby power source;
   a second transistor having a gate, a drain acting as the voltage output, and a source connected to a main power source;
   a driving circuit connecting the signal input to the gate of the second transistor;
   a switching circuit connecting the signal input to the gate of the second transistor;
   wherein when the driving circuit detects the first transistor is switched off, the gate of the second transistor is immediately pulled up to open the second transistor by the switching circuit and the voltage output outputs a main voltage from the main power source, and when the driving circuit detects the first transistor is switched on, the gate of the second transistor is immediately pulled down by the driving circuit to close the second transistor and the voltage output outputs a standby voltage from the standby power source.

9. The switch-mode power supply as described in claim 8, wherein the first transistor is a PMOS transistor and the second transistor is an NMOS transistor.

10. The switch-mode power supply as described in claim 8, wherein the driving circuit comprises a third transistor having an input terminal connected to the signal input, a control terminal, and a fourth transistor connecting a node between the switching circuit and the gate of the second transistor to ground and having an input terminal connected to the control terminal of the third transistor for controlling conduction of the fourth transistor, wherein when a voltage of the gate of the first transistor rises to a turn-off voltage, the third transistor is turned on and the fourth transistor is turned off to thereby allow the switching circuit to immediately pull up the gate of the second transistor to open the second transistor, and when the voltage of the gate of the first transistor falls to a turn-on voltage, the third transistor is turned off and the fourth transistor is turned on to immediately ground the gate of the second transistor to close the second transistor.

11. The switch-mode power supply as described in claim 10, wherein the third transistor comprises an emitter grounded, a collector acting as the control terminal, a base acting as the input terminal, the fourth transistor comprises a source grounded, a drain connected to the node between the switching circuit and the gate of the second transistor, and a gate acting as the input terminal thereof.

12. The switch-mode power supply as described in claim 11, wherein the switching circuit comprises a diode, and a resistor, an anode of the diode is used for receiving the control signal from the signal input, a cathode of the diode is connected to the gate of the second transistor via the resistor.

* * * * *